(12) United States Patent
Duan et al.

(10) Patent No.: US 8,370,921 B2
(45) Date of Patent: Feb. 5, 2013

(54) ENSURING QUALITY OF SERVICE OVER VPN IPSEC TUNNELS

(75) Inventors: Yifei Duan, Beijing (CN); Yufeng Zhu, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 562 days.

(21) Appl. No.: 12/633,353

(22) Filed: Dec. 8, 2009

(65) Prior Publication Data

US 2011/0078783 A1      Mar. 31, 2011

(30) Foreign Application Priority Data

Sep. 30, 2009   (CN) .......................... 2009 1 0204799

(51) Int. Cl.
 *H04L 29/06* (2006.01)
 *H04L 9/00* (2006.01)
(52) U.S. Cl. ............... 726/15; 726/13; 726/14; 713/160; 713/161; 713/162; 713/163
(58) Field of Classification Search ................. 726/15
 See application file for complete search history.

(56) References Cited

U.S. PATENT DOCUMENTS

2007/0165638 A1\* 7/2007 Hasani et al. ................. 370/392

\* cited by examiner

*Primary Examiner* — Longbit Chai
(74) *Attorney, Agent, or Firm* — Harrity & Harrity, LLP

(57) ABSTRACT

Packet sequence number checking through a VPN tunnel may be performed by assigning sequence numbers on a per-priority class basis to packets traversing the VPN tunnel. In one implementation, a network device may receive a packet that is to be transmitted over a VPN tunnel, the packet including control information that includes at least a QoS priority class of the packet. The network device may extract the priority class of the packet from the control information and generate a sequence value that describes an arrival sequence of the packet relative to other received packets of the same priority class as the packet. The network device may additionally generate an IPsec header for the packet, the IPsec header including the sequence value and the priority class of the packet; attach the IPsec header to the packet; and transmit the packet through the VPN tunnel.

25 Claims, 9 Drawing Sheets

ENSURING QUALITY OF SERVICE OVER VPN IPSEC TUNNELS

BACKGROUND

A virtual private network (VPN) is a computer network in which some of the links between nodes are carried by open connections or virtual circuits in some larger network (such as the Internet), as opposed to running across a single private network. The virtual network may be said to be "tunneled" through the transport (open) network. One common application of a VPN is to secure communications through a public network.

One protocol that may be used to implement a VPN session is the Internet Protocol Security (IPsec) protocol suite. IPsec can be used to authenticate and encrypt Internet Protocol (IP) packets of a data stream. In an IPsec VPN tunnel, a sequence number may be associated with each packet as it goes into the secure tunnel. At the end of the tunnel, the sequence number may be checked to ensure the packets are received in the same sequence in which the packets were sent. Sequence numbers can be important for thwarting attacks, such a replay attack. A replay attack is a known network attack technique in which a valid data transmission is maliciously or fraudulently repeated or delayed.

In certain situations, a Quality of Service (QoS) device, such as a router, may be deployed as part of the network over which the VPN tunnel is transmitted. The QoS device may alter the sequences of packets in the VPN tunnel, which may cause problems at the end of the VPN tunnel, as the receiving VPN device may detect a replay attack when one is not actually occurring. It may be desirable to use such QoS devices to implement the VPN tunnel.

SUMMARY

One implementation is directed to a network device that may include an input port to receive a packet that is to be transmitted over a VPN tunnel, the packet including control information that includes at least a priority class of the packet. The network device may additionally include a sequence number component to generate a sequence value that describes an arrival sequence of the packet relative to other received packets of the same priority class as the packet; a header generation component to generate, based on the control information, new control information for the packet, the new control information including the sequence value and an indication of the priority class of the packet; and an output port to transmit the packet, including the new control information, through the VPN tunnel.

In another implementation, a method may include receiving, by a network device, a packet that is to be transmitted over a VPN tunnel, the packet including control information that includes at least QoS priority class of the packet; extracting, by the network device, the priority class of the packet from the control information; generating, by the network device, a sequence value that describes an arrival sequence of the packet relative to other received packets of the same priority class as the packet; generating, by the network device, an Internet Protocol Security (IPsec) header for the packet, the IPsec header including the sequence value and the priority class of the packet; attaching, by the network device, the IPsec header to the packet; and transmitting, by the network device, the packet through the VPN tunnel.

Another possible implementation may be directed to a network device that may include an input port to receive a packet from a VPN tunnel, the packet including control information and payload data, the control information including at least QoS priority class of the packet and a first sequence value that describes an ordering sequence of the packet relative to other received packets of the same priority class as the packet, the payload data including an encrypted version of a second packet. The network device may further include an expected sequence number lookup component to generate a second sequence value based on the priority class of the packet; and a sequence number comparison component to compare the first sequence value to the second sequence value and to output an error signal when the first sequence value does not match the second sequence value.

Another possible implementation may include a method that may include receiving, by a network device, a packet that was transmitted over a VPN tunnel, the packet including control information that includes at least a QoS priority class of the packet and a sequence value that describes an arrival sequence of the packet relative to other received packets of the same priority class as the packet; extracting, by the network device, the priority class of the packet from the control information; extracting, by the network device, the sequence value of the packet from the control information; determining, by the network device, an expected sequence value of the packet based on the priority class of the packet; comparing, by the network device, the sequence value to the expected sequence value; and generating, by the network device, an error signal when the sequence value does not match the expected sequence value.

BRIEF DESCRIPTION OF THE DRAWINGS

The accompanying drawings, which are incorporated in and constitute a part of this specification, illustrate one or more embodiments described here and, together with the description, explain these embodiments. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, packets traversing an IPsec VPN tunnel may be assigned sequence numbers on a per-priority class basis. Additionally, the priority class of the packet at the beginning of the VPN tunnel may be included in the IPsec header for the packet. The priority class in the IPsec header may be extracted at the end of the VPN tunnel and used to lookup the expected sequence number.

Exemplary System Overview

Figure 1:
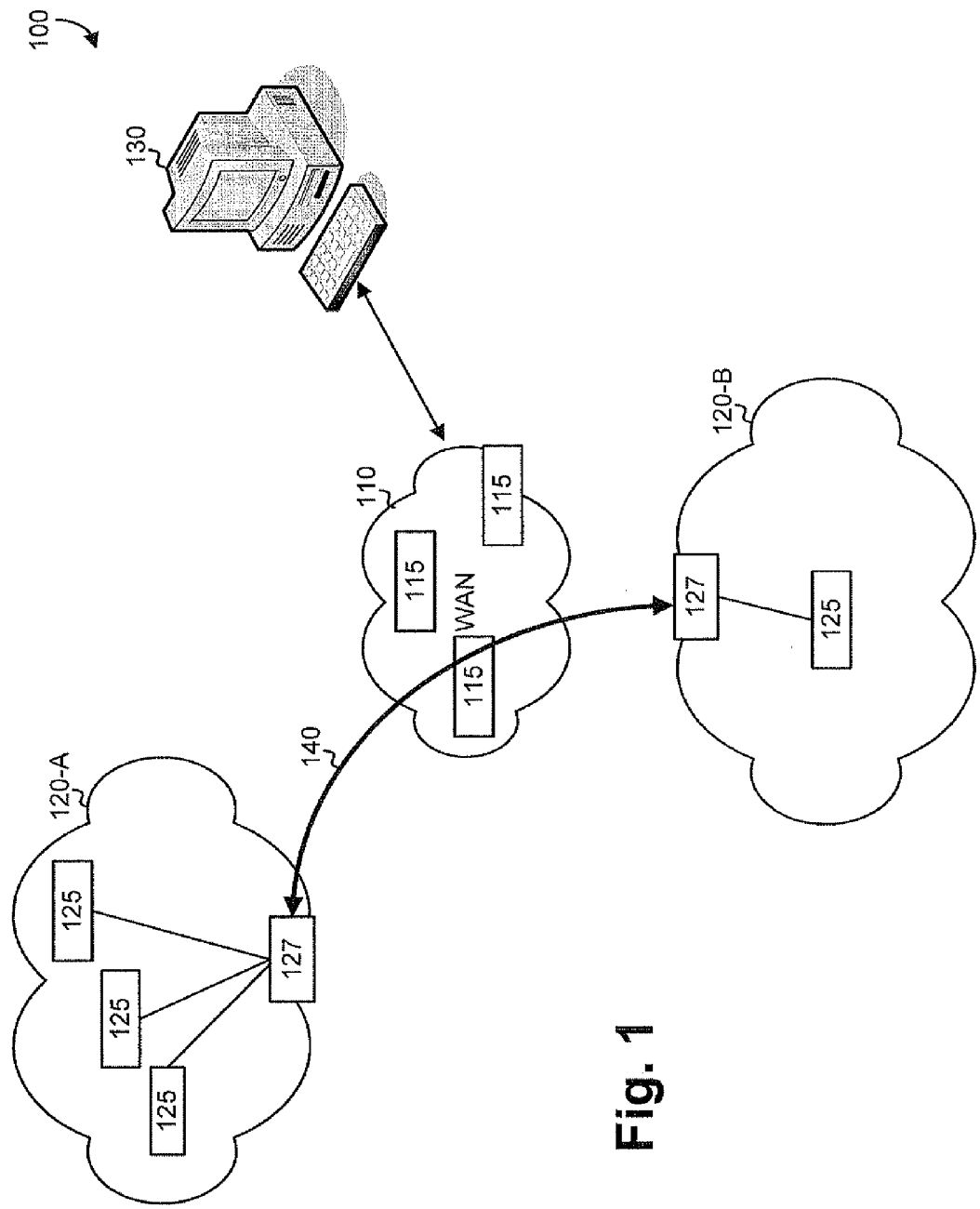
FIG. 1 is a diagram of an exemplary system in which concepts described herein may be implemented.

FIG. 1 is a diagram of an exemplary system 100 in which concepts described herein may be implemented. System 100 may include a wide area network (WAN) 110 connected to one or more private networks 120-A and 120-B (collectively referred to as private networks 120) and a computing device 130. Private networks 120 may each, for example, include corporate or individual local area networks (LANs).

WAN 110 may generally include one or more types of networks. For instance, WAN 110 may include a cellular network, a satellite network, the Internet, or a combination of these (or other) networks that are used to transport data. Although shown as a single element in FIG. 1, WAN 110 may include a number of separate networks that function to provide services to private networks 120 and computing devices, such as computing device 130. WAN 110 may be implemented using a number of network devices 115. Network devices 115 may include, for example, routers, switches, gateways, or other devices that are used to implement WAN 110. Network devices 115 may particularly be Quality of Service (QoS) devices, where a QoS device may refer to a network device that has the ability to provide different traffic processing priorities to different applications, users, or data flows, or to guarantee a certain level of performance to a data flow. For example, a required bit rate may be guaranteed by the QoS device. A router is one example of a QoS device.

Private networks 120 may each include a number of computing devices, such as, for example, client computing stations 125 and network devices 127. Client computing stations 125 may include computing devices of end-users, such as desktop computers or laptops. Network devices 127, similar to network devices 115, may include network devices used to implement private networks 120, such as firewalls, switches, routers, combinations of these devices, or other devices relating to network implementation, control, and/or security.

In one particular implementation, two network devices 127, at different private networks 120, may be IPsec VPN end-points. For example, traffic from private network 120-A to private network 120-B may be encrypted by network device 127 in private network 120-A, sent over VPN tunnel 140 through public network 110, and received at network device 127 in private network 120-B. Network device 127 in private network 120-B may receive the encrypted VPN traffic and convert the traffic to an unencrypted form that can be distributed to client computing station 125. In some implementations, the functionality to implement an IPsec VPN endpoint may be integrated within, for example, a firewall, router, or gateway network device 127.

Computing device 130 may include, for example, a laptop or personal computer connected to WAN 110. Alternatively, computing device 130 may include a mobile device, such as a cell phone, etc.

In the exemplary system shown in FIG. 1, two private networks 120-A and 120-B and one computing device 130 are shown. In other implementations, system 100 may include additional, fewer, different, or differently arranged networks and/or devices. Additionally, in some implementations, tasks described as being performed by one device may be performed by a different one or more devices.

Exemplary Device Architecture

Figure 2:
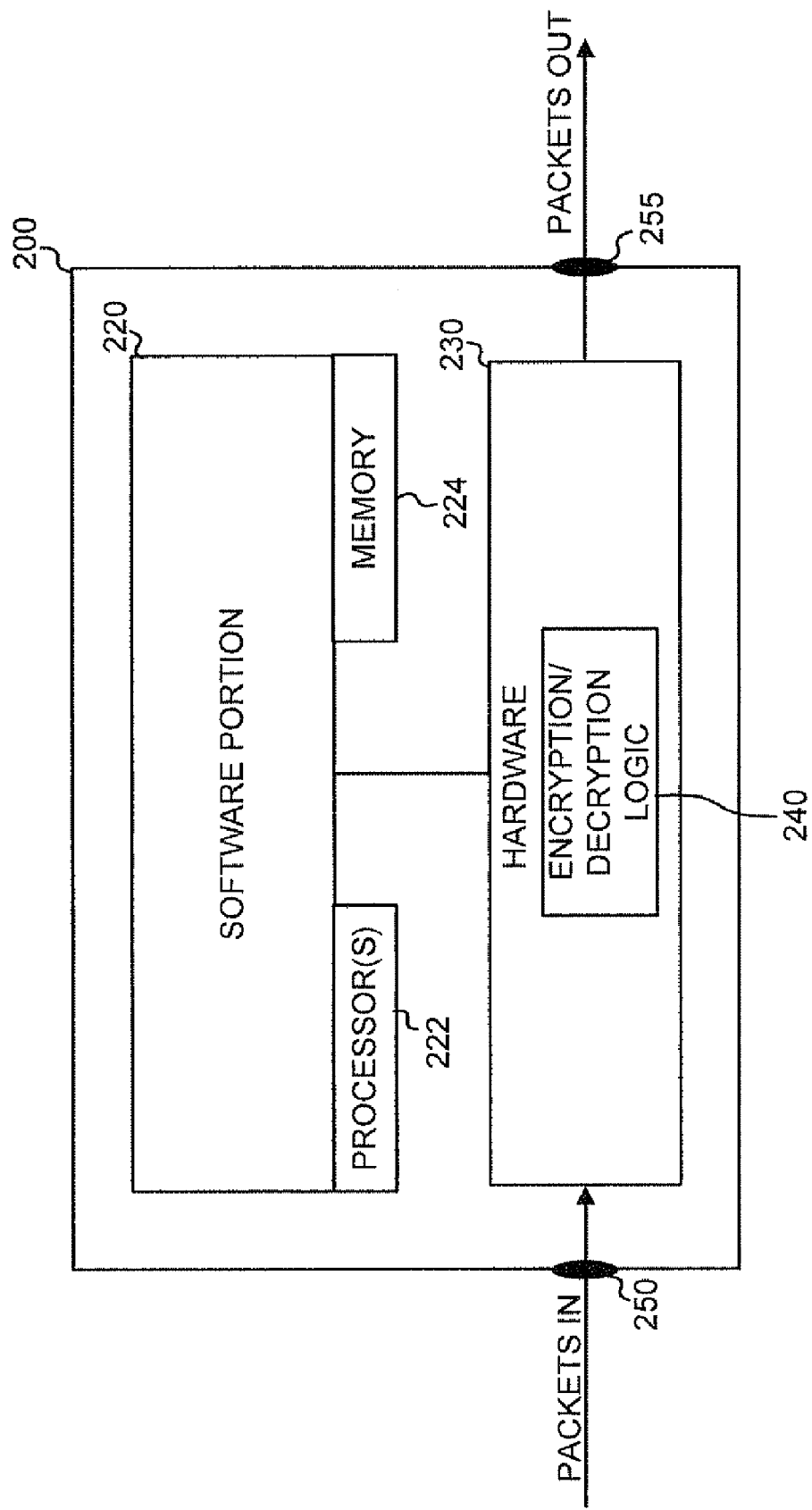
FIG. 2 is a block diagram of an exemplary network device, such as one of the network devices shown in FIG. 1.

FIG. 2 is a block diagram of an exemplary network device 200, which may correspond to one of network devices 115 or 127. In order to increase throughput, network device 200 may use dedicated hardware to process or assist in processing incoming units of data, such as packets. In some alternative implementations, units of data other than packets may be used. As shown in FIG. 2, network device 200 may generally include a software portion 220 and a hardware portion 230.

Software portion 220 may include software designed to control network device 200. For example, software portion 220 may control hardware portion 230 and may provide an interface for user configuration of network device 200. In general, software portion 220 may implement the functions of the network device that are not time critical. The functions described as being performed by software portion 220, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memories (RAMs), read-only memories (ROMs), or other types of dynamic or static storage devices that may store information and instructions for execution by one or more processors 222.

Hardware portion 230 may include circuitry for efficiently processing packets received by network device 200. Hardware portion 230 may include, for example, logic, such as an application specific integrated circuit (ASIC), a field programmable gate array (FPGA), and/or a content-addressable memory (CAM). Hardware portion 230 may, for example, receive incoming packets, extract header information for the packets, and process the packets based on the extracted header information.

When acting as an IPsec VPN tunnel endpoint, hardware portion 230 may include encryption/decryption logic 240. Encryption/decryption logic 240 may, when operating as the beginning of a VPN tunnel, generally act to receive packets, encrypt the packets, and transmit the encrypted packets. Encryption/decryption logic 240 may append a new IP header as well as an IPsec header to the encrypted packet before the encrypted packet is transmitted over VPN tunnel 140. Encryption/decryption logic 240 may, when operating as the end of a VPN tunnel, generally act to receive the encrypted packets, remove the previously added IP header and IPsec header from the packet, and decrypt the packet to obtain the original version of the packet.

Network device 200 may additionally include one or more input ports 250 for receiving incoming packets and one or more output ports 255 for transmitting an outgoing packet. In some implementations, a port may act as both or one of an input port 250 or an output port 255.

Although network device 200 is shown as including a software portion 220 and a hardware portion 230, network device 200 may, in some implementations, be implemented entirely through hardware. Additionally, network device 200 may include additional, fewer, different, or differently arranged components than those illustrated.

IPsec VPN Sequence Numbers

Figure 3:
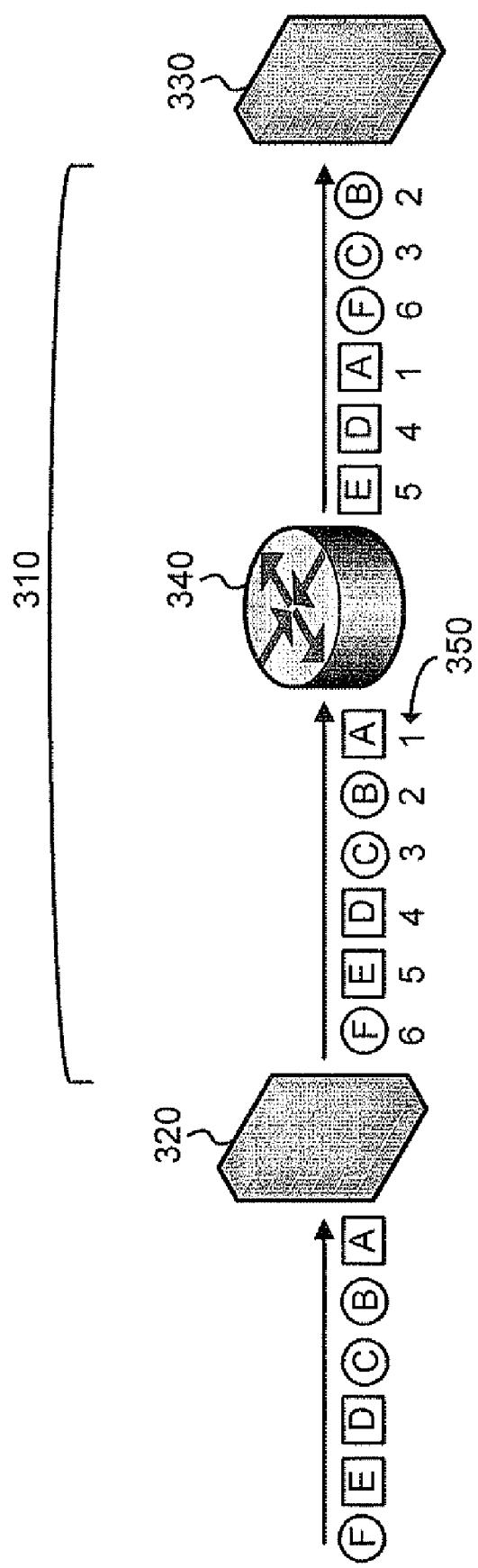
FIG. 3 is a diagram conceptually illustrating the use of sequence numbers for packets in an IPsec VPN tunnel.

End points in an IPsec VPN tunnel, such as tunnel 140, may append sequence numbers to packets transmitted through the tunnel. FIG. 3 is a diagram conceptually illustrating the use of sequence numbers for packets in an IPsec VPN tunnel.

Six exemplary packets of a packet stream, labeled as A, B, C, D, E, and F are shown in FIG. 3. A VPN tunnel 310 may be formed between first IPsec VPN endpoint 320 (which may correspond to network device 127 of network 120-A) and second IPsec VPN endpoint 330 (which may correspond to network device 127 of network 120-B). Further, assume a QoS device, such as router 340, is part of VPN tunnel 310. In other words, router 340 may route packets in VPN tunnel 310 as the packets progress to VPN endpoint 330. Router 340 may process packets differently based on priority classes assigned to the packets. In particular, higher priority packets may be given routing precedence in router 340.

Packets A-F may be assigned to different priority classes. In the example of FIG. 3, assume that the packets are assigned to two different priority classes, priority class one (indicated by a packet label enclosed within a square) and priority class two (indicated by a packet label enclosed within a circle). Assume further that priority class two has a higher priority than priority class one.

VPN endpoint 320 may associate sequence numbers with each of the packets. For example, VPN endpoint 320 may store a sequence number in IPsec headers appended to each of the packets by VPN endpoint 320. The sequence numbers appended by VPN endpoint 320 are shown as sequence numbers 350. Packet A is given the sequence number one, packet B is given the sequence number two, and so on, through packet F, which is given the sequence number six.

QoS device 340, while routing the packets, may reorder the packets in a stream based on the packet priority classes. As shown, packets in priority class two (packets B, C, and F) may be output ahead, by QoS device 340, of the packets in priority class one (packets A, D, and E).

Because of the re-ordering of the packets by QoS device 340, the sequence numbers input to VPN endpoint 340 may be out of order. As shown in FIG. 3, the sequence numbers, instead of being sequentially ordered (i.e., 1, 2, 3, 4, 5, 6) are reordered (i.e., 2, 3, 6, 1, 4, 5). The reordered sequence numbers may cause VPN endpoint 330 to detect a replay attack or to otherwise indicate an error in VPN tunnel 310.

Per-Priority Class Sequence Numbers

Consistent with aspects described herein, VPN endpoints may assign and validate sequence numbers for packets on a per-priority class basis. Additionally, the priority class of the packet as it enters the VPN endpoint may be transmitted in the IPsec header of the packet over the VPN tunnel. By storing the priority identifier in the IPsec header, the priority identifier is not modified as the packet traverses the VPN tunnel. In contrast, "normal" priority information stored in the header field of a packet may be a mutable value that may be changed by intervening QoS devices.

Figure 4:
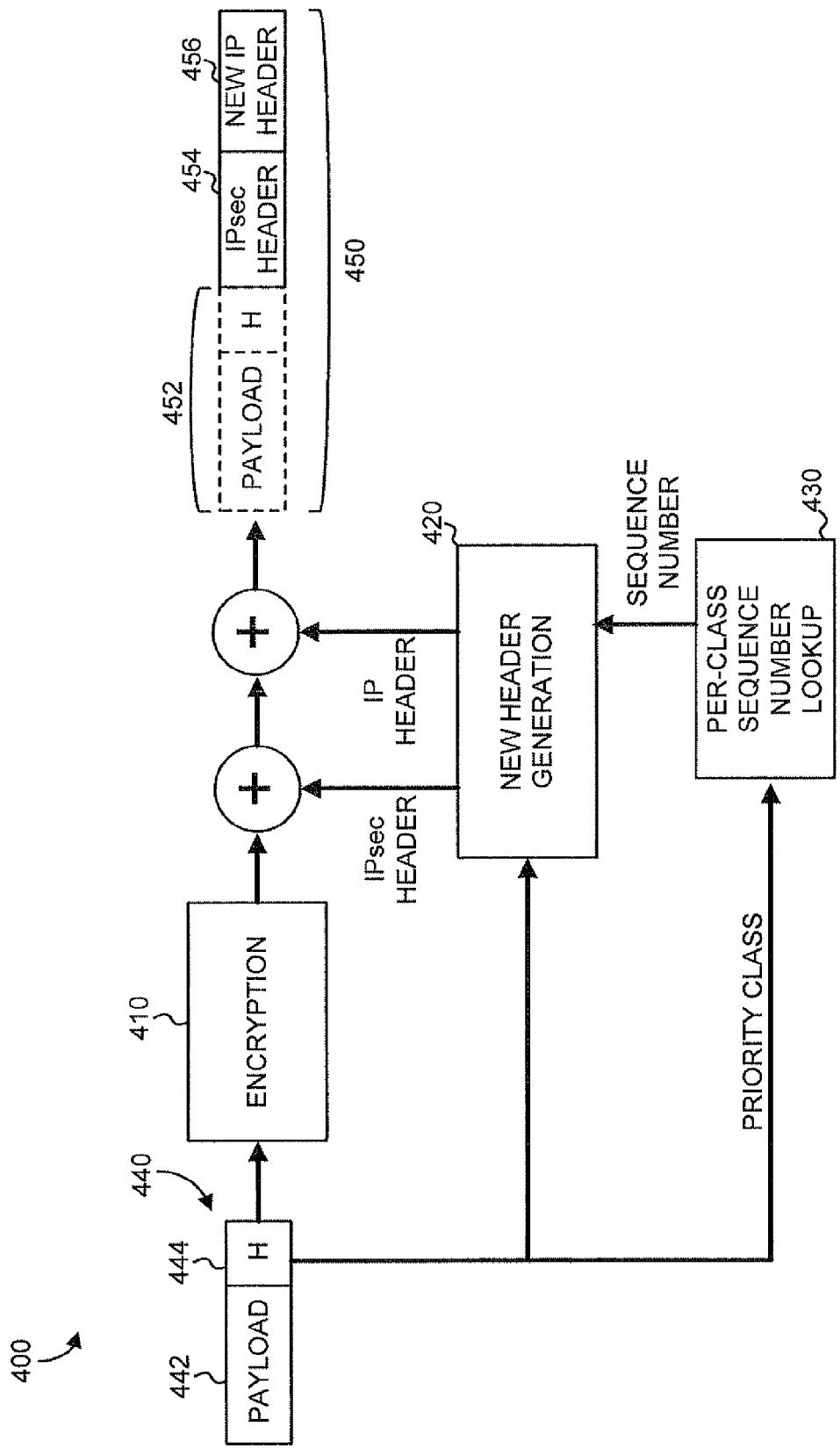
FIG. 4 is a conceptual block diagram illustrating an exemplary implementation of a sending (beginning) VPN endpoint.

FIG. 4 is a conceptual block diagram illustrating an exemplary implementation of a sending (beginning) VPN endpoint 400. In practice, a single network device, such as one of network devices 127, may include functionality of both a sending and receiving VPN endpoint. VPN endpoint 400 may include an encryption component 410, a new header generation component 420, and per-class sequence number lookup component 430.

An incoming packet 440 may be input to encryption component 410. Packet 440 may include a payload section 442 and a header (H) section 444. Payload section 442 may include data that is being transmitted by the packet. Header section 444 may include control information that is used in routing the packet to its destination. The control information may include, for example, source and destination addresses, error detection codes, and a priority class identifier. The priority class may particularly relate to a QoS priority class of the packet. The priority information may be specified in, for example, the DSCP/TOS fields of packet header 444 (Differentiated Services Code Point (DSCP)/type of services (TOS)).

Encryption component 410 may receive the incoming packet 440 and encrypt the packet. In a tunnel mode IPsec VPN session, the entire packet 440, including payload 442 and header 444, may be encrypted and/or authenticated. An encrypted version of packet 440 may be output from encryption component 410.

Per-class sequence number lookup component 430 may receive the priority class from the packet header and, based on the priority class, generate a sequence number for the packet. The sequence number may be on a priority class basis. In other words, each priority class, such as classes specified by the DSCP/TOS packet fields, may be associated with a different series of sequence numbers. In one implementation, per-class sequence number lookup component 430 may implement a lookup table, in which identifiers corresponding to the priority classes are used to retrieve the next sequence number for the priority class. Consecutive sequence numbers may be implemented as sequentially increasing integer values. Additionally, after each lookup, the looked-up sequence number for the class may be incremented in per-class sequence number lookup component 430.

New header generation component 420 may generate new control information for packet 440. When in IPsec "tunnel" mode, the new control information may include a new IP header and an IPsec header. The new headers may be used in routing packet 440 over VPN tunnel 140. The new IP header and the IPsec header may be attached to the encrypted version of packet 440 to obtain packet 450. As shown in FIG. 4, packet 450 may include the encrypted version of packet 440 (labeled as encrypted packet 452), new IP header 456, and IPsec header 454. Generation of new IP header 456 and IPsec header 454 by new header generation component 420 may be based on IP header 440, the IPsec protocol, and the IP routing protocols used by VPN endpoint 400.

An IPsec VPN tunnel may, instead of being formed in "tunnel" mode, may be formed via the IPsec "transport" mode. In transport mode, an IPsec header may be added between the original IP header and the payload. Concepts described herein may also apply to transport mode communications. In this implementation, the new control information may include only the new IPsec header. The original IP header may not be encrypted and may be used to route the packet over the VPN tunnel.

IPsec header 454, as generated by new header generation component 420, may include, among other fields, the sequence number output by per-class sequence number lookup component 430. Additionally, IPsec header 456 may also include an indication of the priority class of packet 440. The priority class information may be inserted, for example, within the conventional sequence number field of an IPsec header.

Figure 5:
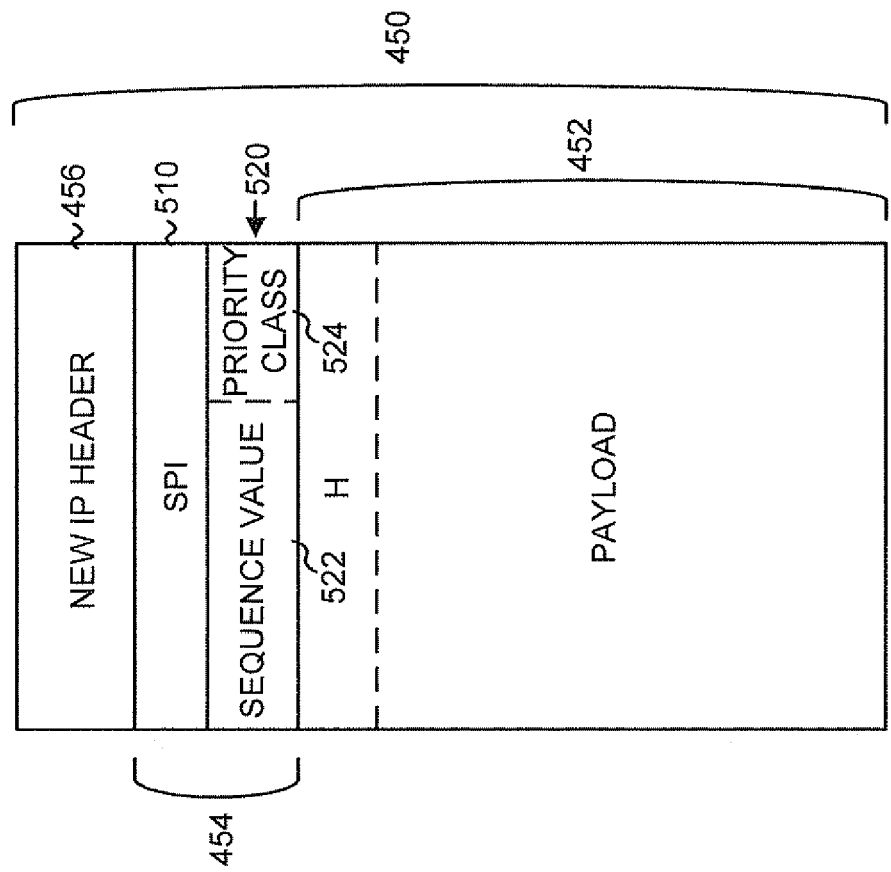
FIG. 5 is a diagram illustrating exemplary fields in a packet.

FIG. 5 is a diagram that illustrates exemplary fields in a packet 450. The exemplary fields shown in FIG. 5 may be fields present when using the encapsulation security payload (ESP) member of the IPsec protocol. ESP may provide origin authenticity, integrity, and confidentiality protection for packets. In alternative implementations, protocols other than IPsec and ESP may be used.

Packet 450, as shown in FIG. 5, particularly illustrates IPsec header 454. IPsec header 454 may include, among other fields, security parameters index (SPI) 510 and sequence number field 520. Other fields, such as trailing authentication fields and padding fields, may be used in an actual implementation of an IPsec VPN packet. SPI field 510 may be used to identify security parameters for the encrypted portion of packet 450.

Sequence number field 520 may be used to store a sequence number for the packet. With a traditional IPsec implementation, sequence number field 520 may be a single field, such as a 32-bit field, used to store a monotonically increasing sequence number. In one implementation, sequence number field 520 may include a sequence value sub-field 522 and a priority class sub-field 524. Sequence value sub-field 522 may store a monotonically increasing per-class identifier value. Priority class sub-field 524 may be used to store an identification value for the priority class of packet 450 when it reaches VPN endpoint 400. In one implementation, sequence value sub-field 522 may be a 26-bit value and class identifier sub-field 524 may be a 6-bit value. In alternative implementations, the sequence number and the class identifier stored in IPsec header 454 may be separate fields.

Figure 6:
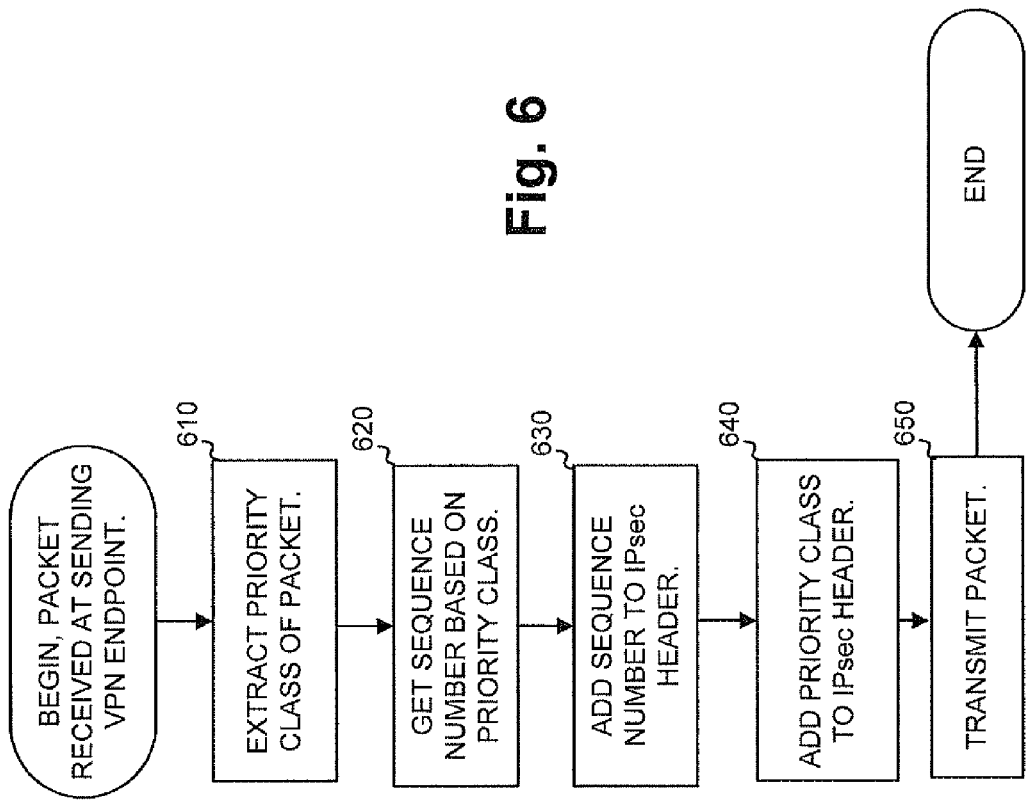
FIG. 6 is a flow chart illustrating exemplary operations that may be performed by a VPN endpoint in sending a packet over a VPN tunnel.

FIG. 6 is a flow chart illustrating exemplary operations that may be performed by VPN endpoint 400 in sending a packet over VPN tunnel 140.

VPN endpoint 400 may extract the priority class corresponding to the packet (block 610). As previously mentioned, the priority class may be included in the DSCP/TOS field of header 444. The priority class may be used to lookup the sequence number (block 620). In particular, per-class sequence number lookup component 430 may use the priority class to generate a separate series of sequence numbers for each priority class.

The sequence number may be added to the IPsec header (block 630). Additionally, the priority class of packet 440 may be added to the IPsec header (block 640). The priority class may be added to the IPsec header in a field that is guaranteed to be immutable during the transmission of packet 440 over VPN tunnel 140. In other words, the priority class should be added to the IPsec header so that it will not be changed as the packet traverses VPN tunnel 140. In one implementation, and as described above, the priority class may be added to a portion of the conventional sequence field in the IPsec header. In contrast, priority class information that is conventionally placed in a packet header may be mutable. That is, network devices that process the packet may change the priority class of the packet.

VPN endpoint 400 may eventually transmit packet 450 (e.g., in an encrypted format), including the determined sequence number and the priority class added to the IPsec header (block 650).

Figure 7:
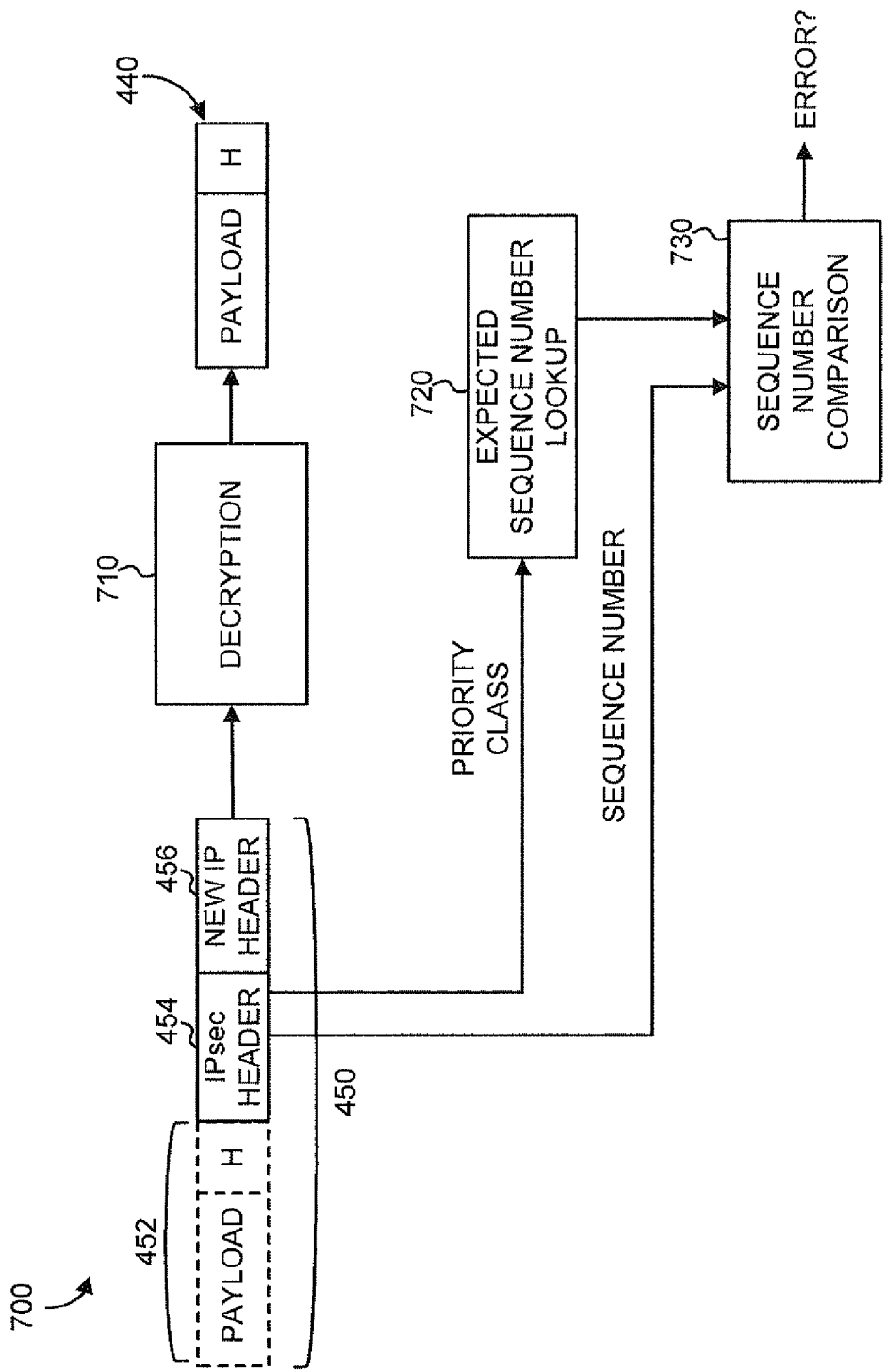
FIG. 7 is a conceptual block diagram illustrating an exemplary implementation of a receiving VPN endpoint.

FIG. 7 is a conceptual block diagram illustrating an exemplary implementation of a receiving VPN endpoint 700. In practice, a single network device, such as one of network devices 127, may include functionality of both a sending and receiving VPN endpoint. VPN endpoint 700 may include decryption component 710, expected sequence number lookup component 720, and sequence number comparison component 730.

Incoming, encrypted packet 450 may be input to decryption component 710. As discussed with respect to FIG. 4, encrypted packet 450 may include an encrypted section 452, a plaintext (not encrypted) IPsec header 454 and IP header 456. Decryption component 710 may decrypt the encrypted section 452 and output the original packet 440, which was received at receiving VPN endpoint 400.

The sequence number and priority class may be extracted from IPsec header 454. For example, the sequence number may be extracted from sequence value sub-field 522 and the priority class may be extracted from priority class sub-field 524.

The priority class may be input to expected sequence number lookup component 720. The priority class may be used to lookup the expected sequence number of the packet. For example, expected sequence number lookup component 720 may keep track of the last sequence number received for each possible input priority class. The expected sequence number may be an incremented version of the last sequence number for the priority class. The expected sequence number may be output from expected sequence number lookup component 720 based on the priority class associated with packet 450.

The sequence number extracted from IPsec header 454 and the expected sequence number output from expected sequence number lookup component 720 may be compared by sequence number comparison component 730. If the two sequence numbers do not "match", sequence number comparison component 730 may output an error signal that indicates a possible error, such as a replay error. Whether a sequence number matches may be based on a conventional anti-replay attack windowing mechanism that is based on the packet sequence number, the expected sequence number, and a window size W. In the anti-replay attack windowing mechanism, it may be determined whether the packet sequence number is in a window extending from the latest packet sequence number (i.e., the expected sequence number) minus the window size W to the latest packet sequence number. If so, and if that sequence number has previously been received, an error indication may be output (e.g., the packet may be discarded). If not, and if that sequence number has not previously been received, the packet may be accepted. If, however, the packet sequence number is less than the beginning of the window (i.e., the expected sequence number minus W), an error indication may be output. If, however, the packet sequence number is greater than the expected sequence number and the packet is authenticated, the window may be advanced (i.e., the expected sequence number may be incremented or set to the received sequence number).

Figure 8:
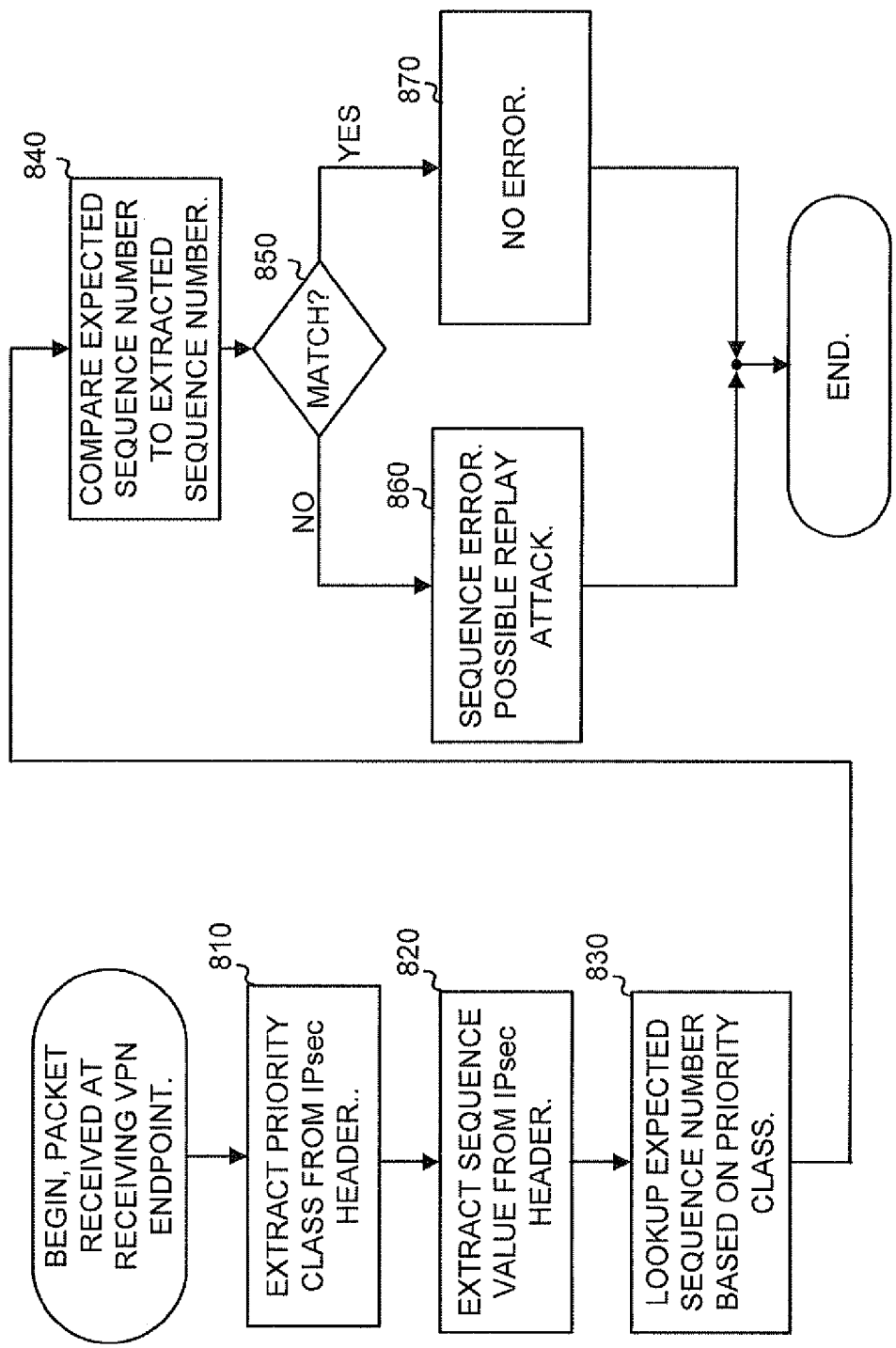
FIG. 8 is a flow chart illustrating exemplary operations that may be performed by a VPN endpoint in receiving a packet over a VPN tunnel.

FIG. 8 is a flow chart illustrating exemplary operations that may be performed by VPN endpoint 700 in receiving a packet over VPN tunnel 140.

VPN endpoint 700 may extract the priority class of the packet (block 810). As previously mentioned, the priority class may be extracted from the IPsec header, such as the priority class stored in priority class identifier sub-field 524 (block 810 and FIG. 5). The sequence value may also be extracted from the IPsec header, such as sequence value 522 (block 820 and FIG. 5).

The expected sequence number may be looked up based on the priority class by expected sequence number lookup component 720 (block 830). The expected sequence number for the priority class may have a value that is equal to the largest previously received sequence number. In one implementation, a counter or integer storage location may be defined for each possible priority class and used to store the expected sequence number. After each sequence number lookup, the counter or storage location may be respectively incremented or updated.

The expected sequence number may be compared to the extracted sequence number (block 840). The comparison may be made by sequence number comparison component 730. The comparison may determine whether the sequence number and the expected sequence number "match" one another (block 850). In one implementation, a match may be determined based on the anti-replay attack windowing mechanism, as described previously.

If the result of block 850 is false (no match), a sequence error may be present (block 860). The sequence error may indicate a possible replay attack. In this situation, remedial measures may be taken, such as discarding the packet. If the result of block 850 is true (i.e., the sequence numbers match) no error is detected and processing may proceed as normal (block 870). Whether there is a sequence number error may be indicated by a signal output from sequence number comparison component 730.

Figure 9:
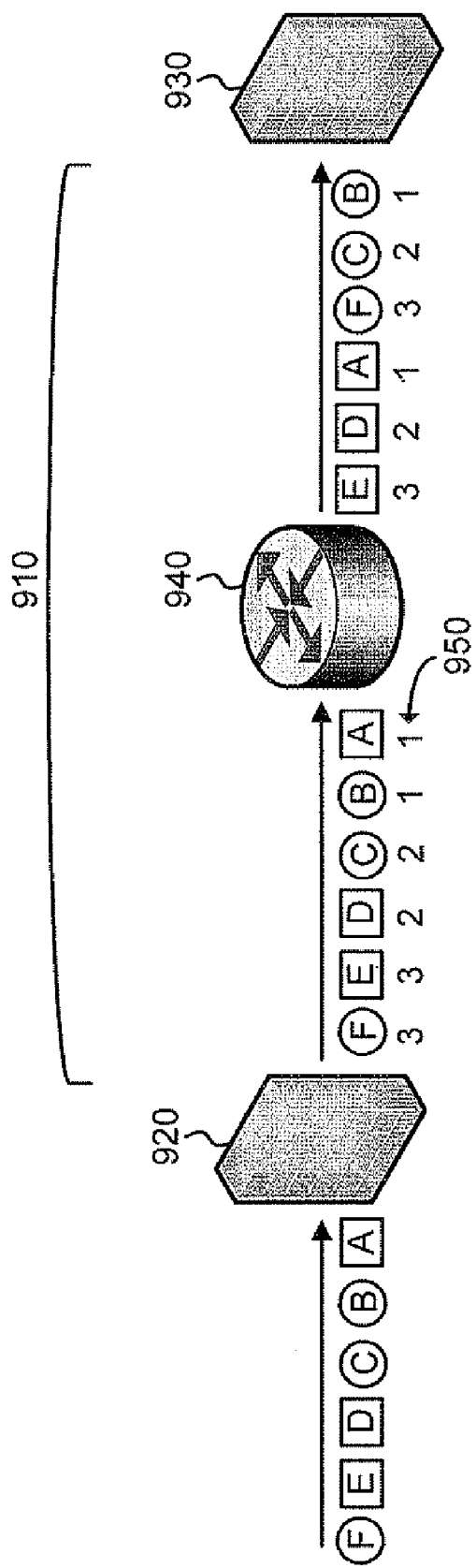
FIG. 9 is a diagram conceptually illustrating the use of sequence numbers for packets in an IPsec VPN tunnel.

FIG. 9 is a diagram conceptually illustrating the use of sequence numbers for packets in an IPsec VPN tunnel, as described previously in reference to FIGS. 4-8.

Six exemplary packets of a packet stream, labeled as A, B, C, D, E, and F are shown in FIG. 9. A VPN tunnel 910 may be formed between first IPsec VPN endpoint 920 and second IPsec VPN endpoint 930, which may correspond to endpoints 400 (FIG. 4) and 700 (FIG. 7), respectively. Further, assume a QoS device, such as router 940, is part of VPN tunnel 910.

Packets A-F may be assigned to different priority classes. In the example of FIG. 9, assume that the packets are assigned to two different priority classes, priority class one (indicated by a packet label enclosed within a square) and priority class two (indicated by a packet label enclosed within a circle). Assume further that priority class two has a higher priority than priority class one.

As previously discussed, VPN endpoint 920 may associate sequence numbers, on a per-priority class basis, with each of the packets. The sequence numbers appended by VPN endpoint 920 are shown as sequence numbers 950. Packets A, D, and E are successive packets in a sequence corresponding to priority class one, and are given sequence values one, two, and three, respectively. Packets B, C, and F are successive packets in a sequence corresponding to priority class two, and are given sequence values one, two, and three, respectively.

QoS device 940, while routing the packets, may reorder the packets in a stream based on the packet priority classes. As shown, packets in priority class two (packets B, C, and F) may be output, by QoS device 940, ahead of the packets in priority class one (packets A, D, and E).

Because VPN endpoint 930 compares sequence numbers on a priority class basis, the re-ordered packets shown in FIG. 9 may still be in sequence order. As particularly shown in FIG. 9, packets in priority class two (B, C, and F) may be received and their sequence numbers successfully compared. Similarly, packets in priority class one (A, D, and E) also remain in sequence number order.

Conclusion

As described above, packet sequence number checking through a VPN tunnel may be performed by assigning sequence numbers on a per-priority class basis to packets traversing the VPN tunnel. Additionally, the priority class of each packet received at the beginning of the tunnel may be embedded within IPsec headers of the packets sent over the VPN tunnel. Embedding the priority class in the IPsec header may be necessary to determine what the priority class of each packet was when it initially entered the tunnel.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6 and 8, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
   an input port to receive a packet that is to be transmitted over a virtual private network (VPN) tunnel, the packet including first control information that includes a priority class of the packet;
   a sequence number component to generate a sequence value,
      an arrival sequence of the packet, at the input port, relative to other received packets, being determined based on the sequence value,
      a priority class, of the other packets, being same as the priority class of the packet,
      the sequence value being generated on a per-priority class basis;
   a header generation component to generate, based on the first control information, second control information for the packet,
      the second control information including the sequence value and an indication of the priority class of the packet; and
   an output port to transmit the packet, including the second control information, through the VPN tunnel.

2. The network device of claim 1, where the packet additionally includes a payload portion and the control information additionally includes a destination address of the packet, and
   where, when transmitting the packet, the output port is to transmit the packet to the destination address.

3. The network device of claim 1, further comprising:
   an encryption component to encrypt the packet to obtain an encrypted packet,
   where the output port is further to transmit the encrypted packet.

4. The network device of claim 3, where the encryption component is further to authenticate the packet prior to the encrypted packet being transmitted.

5. The network device of claim 1, where the second control information includes an Internet Protocol Security (IPsec) header, the IPsec header including a sequence number field, and
   where a first portion of the sequence number field stores the sequence value and a second portion of the sequence number field stores the indication of the priority class of the packet.

6. The network device of claim 1, where the priority class includes a priority class identifier associated with a quality of service in a network.

7. The network device of claim 1, where the sequence number component generates sequence values as series of monotonically increasing values corresponding to different priority classes,
   the sequence values including the sequence value associated with the packet.

8. A method comprising:
   receiving, by a network device, a packet that is to be transmitted over a virtual private network (VPN) tunnel,
      the packet including control information that includes an indication of a quality of service (QoS) priority class of the packet;
   extracting, by the network device, the indication of the QoS priority class of the packet from the control information;
   generating, by the network device, a sequence value,
      an arrival sequence of the packet, relative to other received packets, being determined based on the sequence value,
      a QoS priority class of the other packets and the QoS priority class of the packet comprising a same QoS priority class,
      the sequence value being generated on a per-priority class basis;
   generating, by the network device, a header for the packet, the header including the sequence value and the indication of the QoS priority class of the packet;
   attaching, by the network device, the header to the packet to form a modified packet; and
   transmitting, by the network device, the modified packet through the VPN tunnel.

9. The method of claim 8, where the packet additionally includes a payload portion and the control information additionally includes a destination address of the packet, and
   where transmitting the modified packet comprises:
      transmitting the modified packet to the destination address.

10. The method of claim 8, where the header includes an Internet Protocol Security (IPsec) header, and
    where the sequence value and the indication of the QoS priority class are stored in a single field of the IPsec header.

11. The method of claim 8, where generating the header comprises:
    generating another control information based on the control information,
       the other control information including the sequence value and the indication of the QoS priority class; and
    where attaching the header to the packet comprises:
       attaching the other control information to the packet prior to transmitting the packet.

12. The method of claim 11, further comprising:
    encrypting the packet before attaching the header and the other control information to the packet,
    where the header includes an Internet Protocol Security (IPsec) header.

13. The method of claim 8, where the QoS priority class includes a priority class identifier associated with differentiated quality of services in a network.

14. The method of claim 8, where the header includes an Internet Protocol Security (IPsec) header, and
    where generating the IPsec header includes:
       storing the sequence value in a first portion of an IPsec header sequence number field: and
       storing the indication of the QoS priority class in a second portion of the IPsec header sequence number field.

15. A network device comprising:
    an input port to receive a packet from a virtual private network (VPN) tunnel,
       the packet including control information,
       the control information including a quality of service (QoS) priority class of the packet and a first sequence value,
       an ordering sequence of the packet, relative to other packets, being determined based on the first sequence value,
       a QoS priority class of the other packets and the QoS priority class of the packet comprising a same QoS priority class,
       the first sequence value being generated on a per-priority class basis;
    a sequence number lookup component to identify a second sequence value based on the QoS priority class of the packet; and
    a sequence number comparison component to:
       compare the first sequence value to the second sequence value, and
       output an error signal when the first sequence value does not match the second sequence value.

16. The network device of claim 15, where the error signal indicates that the packet is associated with a replay attack.

17. The network device of claim 15, where the packet further includes payload data and the payload data includes an encrypted version of a second packet,
    the network device further comprising:
       a decryption component to:
          decrypt an encrypted version of the second packet to obtain a decrypted version of the second packet.

18. The network device of claim 17, further comprising:
    an output port to transmit the decrypted version of the second packet.

19. The network device of claim 15, where the control information further includes an Internet Protocol Security (IPsec) header, the IPsec header including a sequence number field,
    where a first portion of the sequence number field stores the first sequence value and a second portion of the sequence number field stores an indication of the QoS priority class of the packet.

20. A method comprising:
    receiving, by a network device, a packet transmitted over a virtual private network (VPN) tunnel,
       the packet including control information that includes a quality of service (QoS) priority class of the packet and a first sequence value,
       an arrival sequence of the packet, relative to other packets, being determined based on the first sequence value,
       a QoS priority class of the other packets being same as the QoS priority class of the packet,
       the first sequence value being generated on a per-priority class basis;

extracting, by the network device, the QoS priority class of the packet from the control information;

extracting, by the network device, the first sequence value of the packet from the control information;

determining, by the network device, a second sequence value of the packet based on the QoS priority class of the packet;

comparing, by the network device, the first sequence value to the second sequence value; and generating, by the network device, an error signal when the first sequence value does not match the second sequence value.

21. The method of claim 20, where the error signal indicates that the packet is associated with a replay attack.

22. The method of claim 20, further comprising:

decrypting payload data, included in the packet, to obtain a second packet; and outputting the second packet from the network device.

23. The method of claim 20, where the control information further includes an Internet Protocol Security (IPsec) header, the IPsec header including a sequence number field, and where a first portion of the sequence number field stores the sequence value and a second portion of the sequence number field stores the QoS priority class of the packet.

24. A non-transitory computer-readable medium storing instructions, the instructions comprising:

a plurality of instructions which, when executed by one or more processors, cause the one or more processors to:

receive a packet that is to be transmitted over a virtual private network (VPN) tunnel, the packet including control information that includes an indication of a priority class of the packet, generate a first sequence value, an arrival sequence of the packet, relative to other packets, being determined based on the first sequence value, a priority class of the other packets and the priority class of the packet comprising a same priority class, the first sequence value being generated on a per-priority class basis, generate, based on a header portion of the packet, other control information for the packet, the other control information including the first sequence value and the indication of the priority class of the packet, transmit the packet, including the other control information, through the VPN tunnel, identify a second sequence value based on the priority class of the packet, compare the second sequence value to the first sequence value, and output an error signal when the second sequence value does not match the first sequence value.

25. The non-transitory computer-readable of claim 24, where the error signal indicates that the packet is associated with a replay attack.

* * * * *

UNITED STATES PATENT AND TRADEMARK OFFICE
CERTIFICATE OF CORRECTION

PATENT NO.         : 8,370,921 B2
APPLICATION NO.    : 12/633353
DATED              : February 5, 2013
INVENTOR(S)        : Duan et al.

It is certified that error appears in the above-identified patent and that said Letters Patent is hereby corrected as shown below:

Please correct claim 14 as follows:

Column 12, line 8, after "field" insert -- ; --.

Signed and Sealed this
Seventh Day of May, 2013

Teresa Stanek Rea
*Acting Director of the United States Patent and Trademark Office*